United States Patent
Lu et al.

(10) Patent No.: US 6,614,557 B1
(45) Date of Patent: Sep. 2, 2003

(54) METHOD FOR DEGRADING GRAYSCALE IMAGES USING ERROR-DIFFUSION BASED APPROACHES

(75) Inventors: Ai-Chieh Lu, Taipei (TW); Jazz Yang, Kaohsiung (TW); Ling-Yi Liu, Taipei (TW)

(73) Assignee: Destiny Technology Corporation, Taipei (TW)

( * ) Notice: Subject to any disclaimer, the term of this patent is extended or adjusted under 35 U.S.C. 154(b) by 0 days.

(21) Appl. No.: 09/454,548

(22) Filed: Dec. 7, 1999

(51) Int. Cl.[7] .............................................. H04N 1/405
(52) U.S. Cl. ..................... 358/3.03; 358/358; 358/3.01; 382/252
(58) Field of Search ............................. 358/3.03, 3.04, 358/3.05, 3.01, 3.22, 1.9, 466; 382/252, 270

(56) References Cited

U.S. PATENT DOCUMENTS 5,208,871 A * 5/1993 Eschbach .................... 382/252
5,805,738 A * 9/1998 Kaburagi et al. ............ 382/252
6,108,105 A * 8/2000 Takeuchi et al. ........... 358/3.27

* cited by examiner

Primary Examiner—Scott Rogers
(74) Attorney, Agent, or Firm—Dickinson Wright PLLC

(57) ABSTRACT

An image transformation method to reduce the number of the gray levels is disclosed. Error diffusion, error bias and a programmable integer C are utilized. For the focus pixel, the value $G_i$ of the original gray scale is read. The related errors $E_j$ previously obtained from some chosen pixels are loaded in. The respective corresponding weighting coefficient $W_j$ for each errors $E_j$ are determined. Then, a resultant gray value $R_i$ of the focus pixel is calculated by $R_i = G_i + \Sigma W_j(E_j - C)$, wherein C is a programmable integer. Thereafter, the gray value $R_i$ is dividing into most significant part $M_i$ and least significant part $L_i$, wherein $M_i$ is a K-bit integer, $L_i$ is an (N-K)-bit integer, $M_i \times 2^{N-K} + L_i = R_i$, and $-2^{N-K}/2 \leq L_i < 2^{N-K}/2$. The error $E_i$ of the focus pixel is stored as $L_i$ plus an error bias D of $2^{N-K}/2$. Finally, the focus pixel is displayed using $M_i$ as the degraded target gray value.

14 Claims, 4 Drawing Sheets

$Ri = X \times 2^4 + Y = Mi \times 2^4 + Li$

| Ri | Y | Mi | Li | Ei |
|---|---|---|---|---|
| $Mi \times 2^4 + 7$ | 7 | X | 7 | 15 |
| $Mi \times 2^4 + 6$ | 6 | X | 6 | 14 |
| $Mi \times 2^4 + 5$ | 5 | X | 5 | 13 |
| $Mi \times 2^4 + 4$ | 4 | X | 4 | 12 |
| $Mi \times 2^4 + 3$ | 3 | X | 3 | 11 |
| $Mi \times 2^4 + 2$ | 2 | X | 2 | 10 |
| $Mi \times 2^4 + 1$ | 1 | X | 1 | 9 |
| $Mi \times 2^4 + 0$ | 0 | X | 0 | 8 |
| $(Mi-1) \times 2^4 + F$ | F | X+1 | -1 | 7 |
| $(Mi-1) \times 2^4 + E$ | E | X+1 | -2 | 6 |
| $(Mi-1) \times 2^4 + D$ | D | X+1 | -3 | 5 |
| $(Mi-1) \times 2^4 + C$ | C | X+1 | -4 | 4 |
| $(Mi-1) \times 2^4 + B$ | B | X+1 | -5 | 3 |
| $(Mi-1) \times 2^4 + A$ | A | X+1 | -6 | 2 |
| $(Mi-1) \times 2^4 + 9$ | 9 | X+1 | -7 | 1 |
| $(Mi-1) \times 2^4 + 8$ | 8 | X+1 | -8 | 0 |

METHOD FOR DEGRADING GRAYSCALE IMAGES USING ERROR-DIFFUSION BASED APPROACHES

FIELD OF THE INVENTION

The present invention relates to a method of transformation of images, and more especially, to a method for degrading the required bit number of grayscale images by an error diffusion scheme.

BACKGROUND OF THE INVENTION

In general, image-processing devices, such as scanners, printers, or fax machines, provide a certain number of memory bits to indicate a gray value of a picture element named pixel. For example, one bit is provided for a binary case where only two gray levels can be differentiated, typically, 1 for a spot and 0 for no spot. In another case, an 8-bit image-processing device provides 256 gray scales, where each gray value of a pixel is ranged from 0 to 255. As noted, the more bits can be provided for a pixel, the more gray levels can be differentiated.

Basically, different image-processing devices employ different resolutions established by different bit numbers. The resolution transformation is thus unavoidable when image data are transmitted from one device to another. For transformation from a higher resolution to a lower one, error diffusion is a well-known technique to provide such a transformation with a certain degree of degradation compensation.

When an image with a higher resolution is transformed to one with a lower resolution, image distortion will be caused due to portions of the bit number being truncated. To compensate for that, the truncated error of a pixel is distributed or diffused to some of its neighboring pixels, typically those nearest pixels downstream from the focus one. FIG. 1A shows a case in a focus pixel contributes its truncated error to the four nearest pixels downstream as indicated by the arrows. FIG. 1B shows for the same case that the truncated errors distributed in the focus pixel come from four nearest pixels upstream. Further, for the purpose of balancing image tone, the diffusions are preferably distributed in opposite directions along two immediate adjacent scan lines as shown in FIG. 1C.

However, until now, for the error diffusion method, only the method for transforming a grayscale image to a binary image has been successfully developed. These binary cases can be easily achieved using a threshold value for comparison and truncation. In these cases, those original gray values greater than a predetermined threshold value are transformed to target values of 1, and those of a lower value are transformed to 0. However, there is no error diffusion method for transforming a grayscale image to one with reduced bit number instead of transforming to a binary image.

SUMMARY OF THE INVENTION

The present invention proposes an image transformation method to degrade a N-bit grayscale image to a reduced K-bit grayscale image. Error diffusion, error bias and a programmable integer C are utilized for the present method.

Firstly, for the focus pixel, the original grayscale value is read and denoted by $G_i$, which is an N-bit integer with a value within $[0, 2^N-1]$. The related errors $E_j$ previously obtained from some chosen pixels are subsequently loaded. The respective corresponding weighting coefficient $W_j$ for each error $E_j$ is determined. Then, a resultant gray value $R_i$ of the focus pixel after error diffusion can be calculated by the following equation:

$$R_i = G_i + \sum_j w_j E_j - C$$

Herein, C is a programmable integer for compensating the error bias and, if necessary, for adjusting the brightness of the entire target image.

Thereafter, the degradation of the gray value can be implemented by dividing the gray value $R_i$ into a first part $M_i$ and a second part $L_i$, wherein $M_i$ is a K-bit integer, $L_i$ is an (N-K)-bit integer, and $M_i$ and $L_i$ satisfy the following equations:

$$M_i \times 2^{N-K} + L_i = R_i$$

$$-2^{N-K}/2 \leq L_i < 2^{N-K}/2,$$

$L_i$ is then truncated form the resultant gray value $R_i$ and stored as the error of the focus pixel. The error $E_i$ of the focus pixel is stored as $L_i$ plus an error bias D of $2^{N-K}/2$, that is, $$E_i = L_i + 2^{N-K}/2.$$

After the error bias D of $2^{N-K}/2$ is added, the computed errors will be stored as non-negative integers and fall in the range of $0 \leq E_i < 2^{N-K}-1$. Finally, the focus pixel is displayed using $M_i$ as the degraded target gray value.

BRIEF DESCRIPTION OF THE DRAWINGS

The foregoing aspects and many of the attendant advantages of this invention will become more readily appreciated as the same becomes better understood by reference to the following detailed description, in conjunction with the accompanying drawings, wherein.

DESCRIPTION OF THE PREFERRED EMBODIMENT

The present invention proposes a novel method for transforming a grayscale image to a lower-level grayscale image. This method utilizes error diffusion to distribute the truncated error and to compensate for the degradation effect. In addition, an error bias is utilized to avoid calculation of a negative number and to simplify the circuitry. Furthermore, a programmable integer C is employed to control the overall brightness of the objective image.

Before the image transformation method is run, the original number of gray levels and the target number of gray levels is determined. The original number, in a binary system, is typically $2^N$, wherein N, such as 8, is an integer indicating the bits used for an original gray level of a pixel. The target number is $2^K$, wherein K is also an integer but is smaller than N, such as 2, 4, or 6, and K indicates the number of bits used for a target gray level of a pixel. N and K both depend on the memory provided in the equipment.

Figure 2:
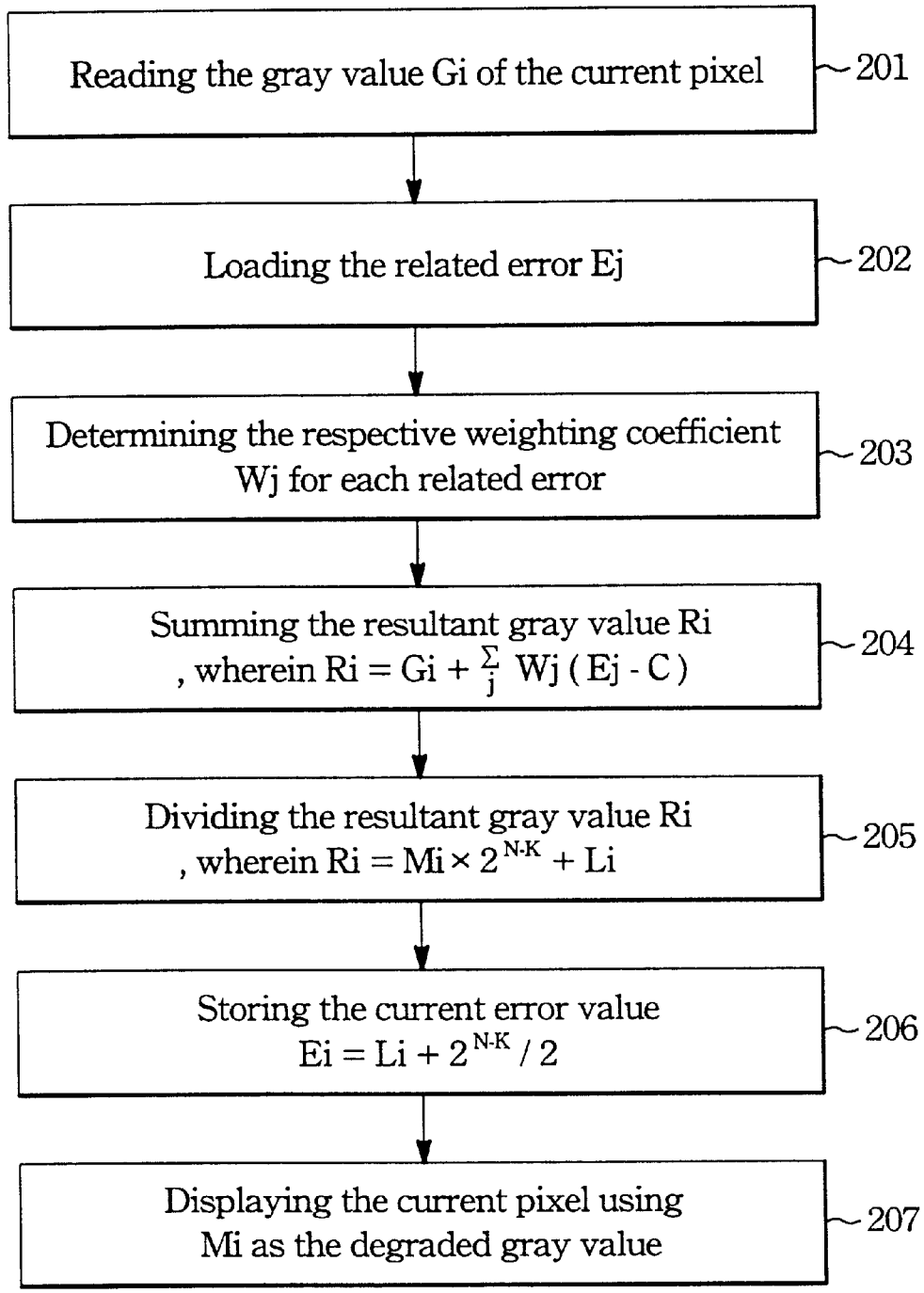
FIG. 2 is a flowchart of the image data transformation process according to the present invention.

Once the original and target numbers are determined, the error diffusion process can then be carried out. FIG. 2 depicts the main flowchart of the present invention to transform the original image to the target one. Firstly, as the display equipment scans a focus pixel $P_i$ in a focus scan line, the original gray value of this pixel is read and denoted by $G_i$, which is an N-bit integer ranged within $0 \leq G_i \leq 2^N-1$ (Step 201). Different values of index i indicate different pixels. $G_i$ can be expressed as $M'_i \times 2^{N-K} + L'_i$, wherein $M'_i$ is a K-bit integer and $L'_i$ is an (N−K)-bit integer. M' represents the first K-bit data of the N-bit gray value of the focus pixel. L' represents the last (N−K)-bit data of the gray value. The original gray value $G_i$ is thus divided into two parts: a first number $M'_i$ and a second number $L'_i$, respectively related to the target gray level and an error to be diffused.

Figure 1A:
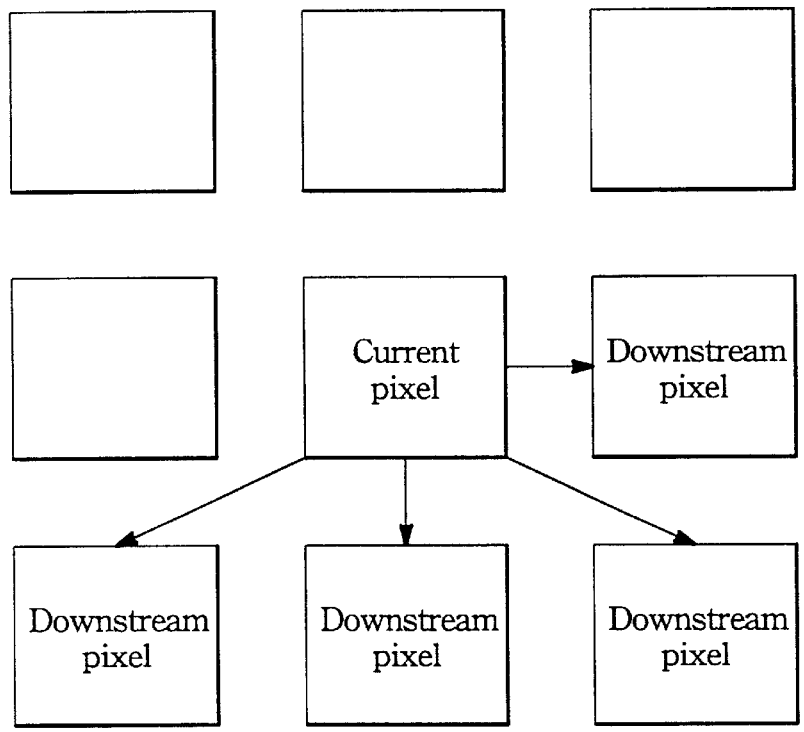
FIG. 1A is a graphical representation showing the error distribution from a pixel to four nearest pixels downstream according to the prior art.
Figure 1B:
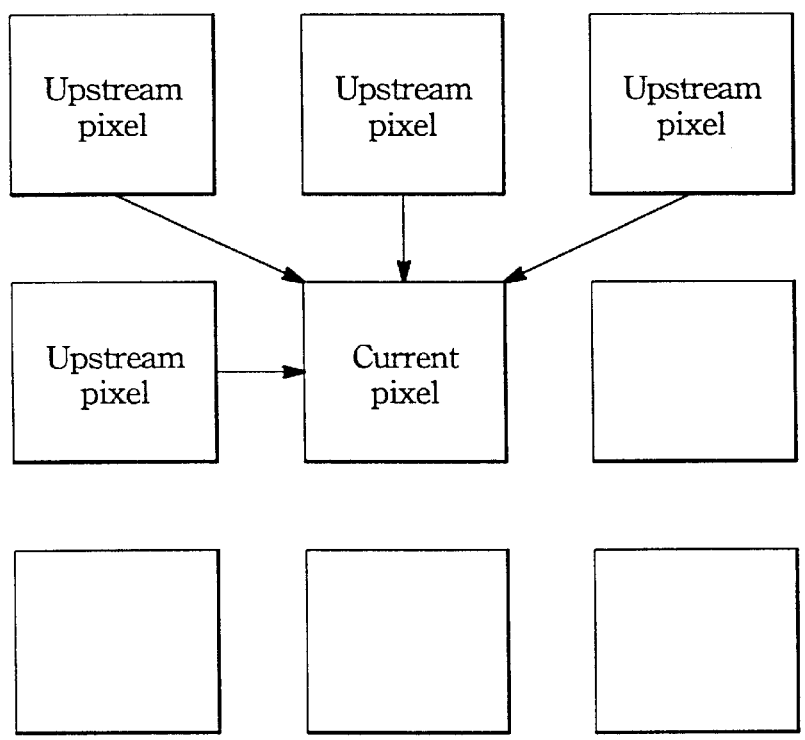
FIG. 1B is a graphical representation showing the truncated errors distributed to a pixel from four nearest pixels upstream according to the prior art.

Thereafter, related errors $E_j$ previously obtained from some chosen pixels are loaded in, wherein j indicates those pixels contributing their errors to the focus one (Step 202). Those related pixels that contribute their errors to the focus pixel could be selected according to the distribution design and the capacity of the equipment, especially the memory provided. In a real time embodiment, the related errors can be distributed or diffused from the nearest four pixels located upstream of the focus one, that is, the left, upper left, upper, upper right neighboring pixels as shown in FIG. 1B. In another embodiment wherein display devices have sufficient memory for storing error data obtained from more than three scan lines, the nearest eight pixels around the focus one, no matter upstream or downstream, can be chosen to contribute their errors to the focus pixel. At this step, if the focus pixel for loading related errors is the first one without previous processed pixels, those related errors could be assumed to be zero. Furthermore, if there are some neighboring pixels assigned to be related pixels without previous error generations, a step to find errors contributed from these pixels should be carried out at this moment. The original gray values of these pixels are then each divided into a first value of K bit and an error of N−K bit as dividing the original gray value $G_i$ into the first number $M'_i$ and a second number $L'_i$. The errors obtained from these pixels are then joined to those related errors $E_j$.

Figure 1C:
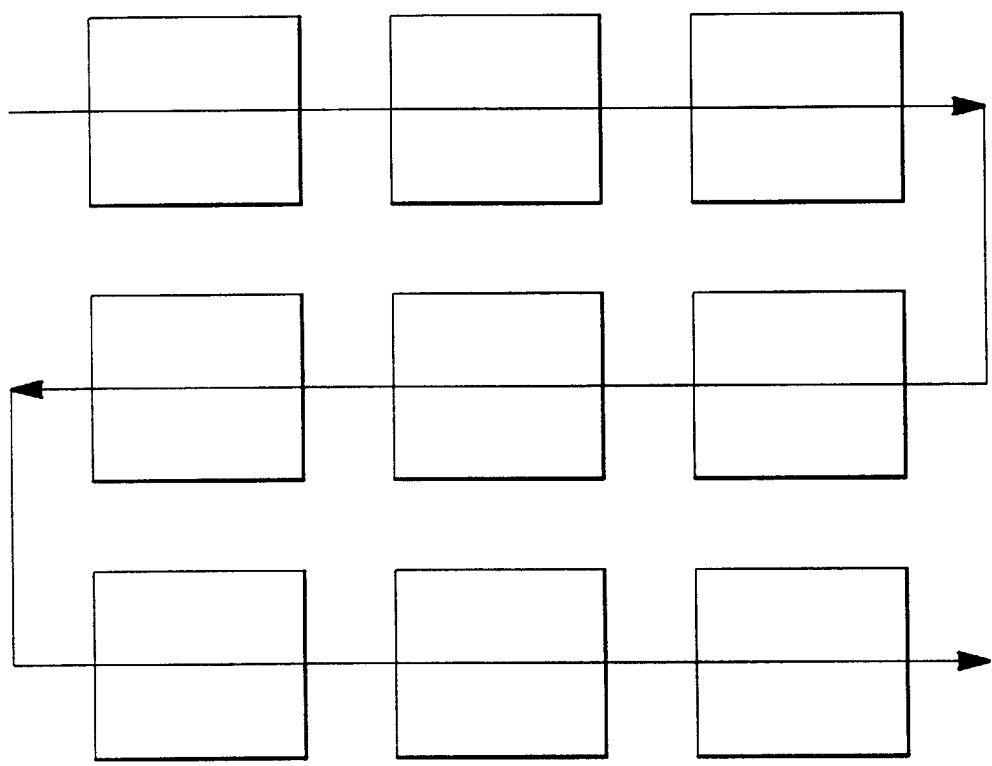
FIG. 1C is a graphical representation showing the error distribution directions for different scan lines according to the prior art.

After the related errors $E_j$ are loaded in, a corresponding weighting coefficient $W_j$ for each error $E_j$ is determined (Step 203). The corresponding weighting coefficients represent the ratios of errors distributed to a pixel from other pixels, or the ratios of an error distributed from a pixel to other pixels. In a standard embodiment, the sum of all the corresponding weighting coefficients distributed to a pixel is one (1), as well as the sum of those from a pixel. In addition, for some display equipment such as printers, all of those scan lines are scanned in the same direction, from left to right. That is, the left-most pixel in a scan line will be the next scanned pixel when the last pixel is the right-most one of last scan line. Therefore, the weighting coefficients $W_j$ can be programmed with different values for two adjacent scan lines to compensate the same error diffusion direction, which is different from the one shown in FIG. 1C.

When an error $E_j$ and the corresponding weighting coefficients $W_j$ are obtained, a resultant gray value $R_i$ of the focus pixel after error diffusion can be calculated by adding an error. sum to the original gray value $G_i$ (Step 204). The error sum for the focus pixel is a summation of all of the related errors which is further multiplied by respective corresponding weighting coefficients after a predetermined integer C is subtracted from each of the related errors. The equation for the calculation of the resultant gray value $R_i$ is displayed as follows:

$$R_i = G_i + \sum_j w_j(E_j - C)$$
$$= G_i + \sum_j w_j E_j - C \sum_j w_j$$
$$= G_i + \sum_j w_j E_j - C$$

Herein, C is a programmable integer that can compensate the error bias, which is selectively added while the related errors are stored. This will be described later. Alternatively, integer C can further be programmed to further adjust the intensity of gray scale for the brightness of the entire target image. Therefore, integer C can be regarded as having two parts: one is the compensating factor for the error bias, the other is the brightness-biasing factor.

When the resultant gray value $R_i$ of the focus pixel is obtained, the degradation of the gray value can be implemented by dividing the gray value $R_i$ into a first part $M_i$ and a second part $L_i$ as dividing $G_i$ into $M'_i$ and $L'_i$ (Step 205). The first part $M_i$ is a K-bit integer representing the first K-bit data of the N-bit resultant gray value $R_i$ of the focus pixel. The second part $L_i$ is an (N−K)-bit integer representing the last K-bit data of the resultant gray value $R_i$. $M_i$ and $L_i$ satisfy the following equations:

$$M_i \times 2^{N-K} + L_i = R_i$$

$$2^{N-K}/2 \leq L_i < 2^{N-K}/2,$$

In a usual practice, the second part $L_i$ would first appear as a positive integer within the range. of $0 < L_i < 2^{N-K}-1$. Then, for those $L_i > 2^{N-K}/2$, $2^{N-K}$ can be subtracted form $L_i$, and unit be added to $M_i$ simultaneously to fit above equation without changing the value of $R_i$. That is, $R_i = (M_i+1) \times 2^{N-K} + (L_i - 2^{N-K})$ if $L_i > 2^{N-K}/2$. For an actual example, 8-bit binary number 10011100 is equal to $9 \times 2^4 + 12$ as well as $(9+1) \times 2^4 + (12-16)$ (that is $10 \times 2^4 - 4$) in decimal system.

As one can understand, $M_i$ bears the message from the first K bits of the resultant gray value $R_i$, and $L_i$ bears the message from the last (N−K) bits. Therefore, the second part $L_i$ is truncated from the resultant gray value $R_i$ and is stored as the error of the focus pixel for distribution or diffusion to the subsequently processed pixels (Step 206). In a preferred embodiment to prevent computing of any negative number, the error $E_i$ of the focus pixel can alternatively be stored as the second part $L_i$ plus an error bias D, wherein the error bias D is $2^{N-K}/2$, that is, $$E_i = L_i + 2^{N-K}/2.$$

After the error bias D of $2^{N-K}/2$ is added, the error $E_i$ then falls in the range of $0 < E_i < 2^{N-K}-1$, that is, all errors $E_i$ will be stored as a non-negative integer. Due to no negative number being processed, the required memory can be significantly reduced, and the circuitry for implementing the calculation can be simplified. The error bias can alternatively be added to the errors after they are loading for another pixel to serve as its related errors, as long as the additions are carried out before the resultant gray value is calculated. However, adding the error bias D to the errors before they are stored can save some computing times when they are distributed to more than one neighboring pixel.

Finally, the focus pixel is displayed using the first part $M_i$ of $R_i$ as the degraded target gray value (Step 207). Since the first part $M_i$ is an integer of K-bit, and $M_i$ is obtained from $R_i$, which is calculated to include the related errors, the image transformation to reduce the number of the gray levels from $2^N$ to $2^K$ using error diffusion method is thus completed.

Figures 3A, 3B:
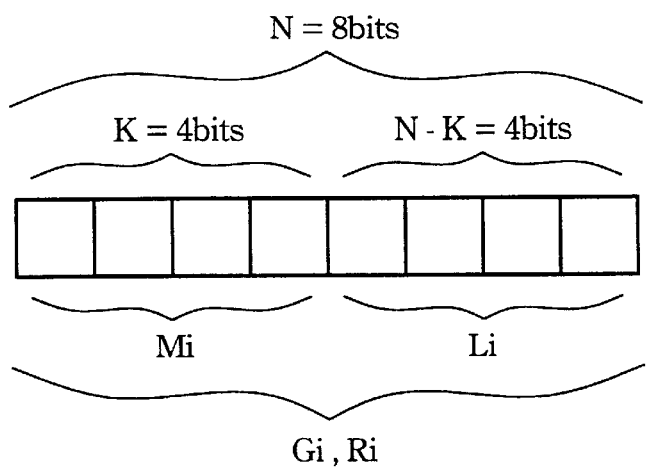
FIG. 3A is a graphical representation showing the relations between an 8-bit original gray value and a 4-bit target gray value.
FIG. 3B is a table showing the relations between an 8-bit original gray value, a 4-bit target gray value, and the distributed error of a pixel.

FIG. 3A and FIG. 3B illustrate an embodiment of transformation from 8-bit gray values to 4-bit gray values. In this embodiment, FIG. 3A shows the relations between N, K, $G_i$, $M'_i$, and $L'_i$, wherein N=8, K=4, and we can express $M'_i$, $L'_i$, $E_j$, $M_i$, $L_i$, as hex numbers.

Following the steps described above, a focus gray value $G_i$ is first read (Step 201). Herein $G_i$ is an 8-bit integer within 0 to FF (in hex, $F=2^4-1=15$, and also F=1111, wherein the latter is a binary number). Then, related errors $E_j$ are loaded in (Step 202). In a real time embodiment, four related errors $E_{left}$, $E_{upleft}$, $E_{up}$, and $E_{upright}$ are are loaded to a pixel from the left, upper-left, upper and upper-right in neighboring pixels.

Thereafter for weighting coefficients $w_{left}$, $w_{upleft}$, $w_{up}$, and $W_{upright}$, respectively corresponding to $E_{left}$, $E_{upleft}$, $F_{up}$, and $E_{upright}$ are determined (Step 203) under the condition $w_{left}+w_{upleft}+w_{up}+w_{upright}=1$. The resultant gray value $R_i$ is computed by $$R_i = G_i + [w_{left} \times (E_{left} - C) + w_{upleft} \times (E_{upleft} - C) + w_{up} \times (E_{up} - C) + w_{upright} \times (E_{upright} - C)],$$
$$= G_i + (w_{left} \times E_{left} + w_{upleft} \times E_{upleft} + w_{up} \times E_{up} + w_{upright} \times E_{upright}) - C,$$

wherein C has a standard value of 8, and $R_i$ is also an 8-bit integer within the range of 0 to FF as $G_i$.

Then, $R_i$ is divided into a first part $M_i$ and a second part $L_i$ (Step 205). $M_i$ and $L_i$ are both 4-bit integers. $M_i$ ranges from 0 to F, and $L_i$ ranges from −8 to 7. FIG. 3B illustrates the relations between $R_i$, $M_i$, $L_i$ and $E_i$, wherein X and Y are 4-bit integers respectively representing the first and last 4 bit message of $R_i$. For those Ys greater than 8, $M_i$ is stored as X+1, and $L_i$ is stored as Y−16.

After $M_i$ and $L_i$ are obtained, the error $E_i$ generated from the focus pixel is stored as $L_i+8$ as shown in FIG. 3B (Step 206). Finally, the focus pixel is displayed using $M_i$ as the 4-bit target gray value (Step 207), and the transformation is completed As is understood by a person who is skilled in the art, the foregoing preferred embodiments of the present invention are illustrated for descriptive purpose and shall not limit the scope of the present invention. They are intended to cover various modifications and similar arrangements within the scope of the present invention by means of the appended claims, the scope of which should be accorded the broadest interpretation so as to encompass all such modifications and similar structures.

What is claimed is:

1. A method for quantizing a source image consisting of pixels each with an N-bit original gray value into an objective image consisting of pixels each with a K-bit target gray value, wherein N and K are integers and N is greater than K, said method comprising the following steps:

selecting one of said pixels to be a focus pixel;

reading said original gray value of said focus pixel;

loading a number of errors generated previously from said number of neighboring pixels located in chosen positions related to said focus pixel;

providing for each of said neighboring pixels a corresponding weighting coefficient;

providing for each of said neighboring pixels a weighted error by multiplying said error thereof with said corresponding weighting coefficient;

providing for said focus pixel a resultant gray value by summing said original gray value thereof with said weighted errors of said neighboring pixels; and dividing said resultant gray value into an output of k bit and an error of (N−K) bit.

2. A method according to claim 1 further comprising a step of finding error from one of said neighboring pixels by dividing said original gray value of said neighboring pixel into a first value of N bit and said error of N−K bit when there is no error previously generated from said neighboring pixel.

3. The method according to claim 1, wherein said corresponding weighting coefficients of said neighboring pixels are summed to 1 for said focus pixel.

4. A method according to claim 1 further comprising the following step:

biasing each of said errors of said neighboring pixels by adding a first bias of a positive integer thereto so that said errors will be non-negative values before said weighted errors are provided; and compensating said resultant gray value of said focus pixel by subtracting said first bias therefrom after said weighted errors are provided.

5. A method according to claim 1 further comprising a step of biasing said error by adding a second bias.

6. A method according to claim 5, wherein said second bias is programmable according to the brightness desired for said objective image.

7. A method according to claim 1, wherein said steps of claim 1 are repeated for each one of a plurality of pixels selected to be focus pixels one after another following a scan direction.

8. A method according to claim 7, wherein one of said pixels next to said focus pixel in said scan direction is selected to be next focus pixel.

9. A method according to claim 7, wherein said source image and said objective image both consisting of scan lines each consisting of a plurality of said pixels.

10. A method according to claim 9, wherein said scan direction is left to right throughout each of said scan lines.

11. A method according to claim 10, wherein one of said pixels to the right of said focus pixel is selected to be next focus pixel.

12. A method according to claim 10, wherein the left-most pixel in a scan lines is selected to be next focus pixel when said focus pixel is the right-most pixel of last scan line.

13. A method according to claim 10, wherein said neighboring pixels are located in the up-left, up, up-right and left positions to said focus pixel.

14. A method according to claim 9, wherein said weighting coefficients are different for different focus pixels in adjacent scan lines.

* * * * *